J. W. CALHOUN.
METER TESTING MACHINE.
APPLICATION FILED JULY 25, 1919.
1,434,198.
Patented Oct. 31, 1922.
4 SHEETS—SHEET 4.
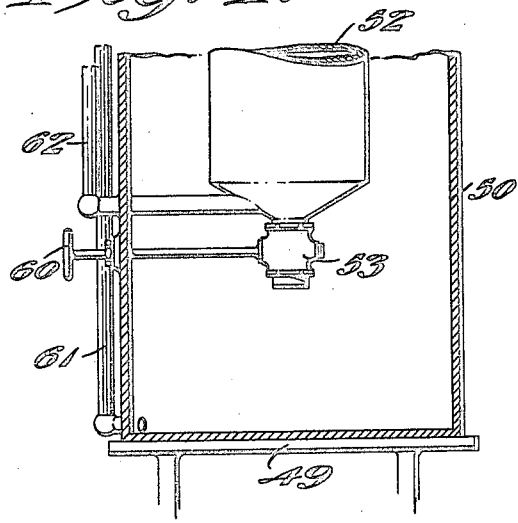
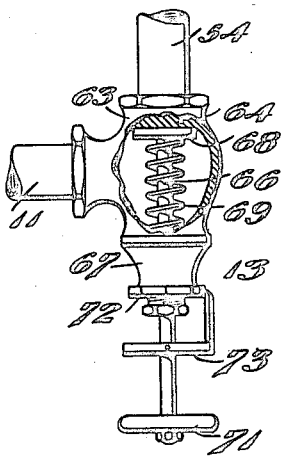
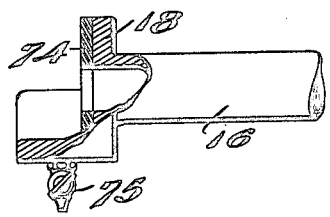
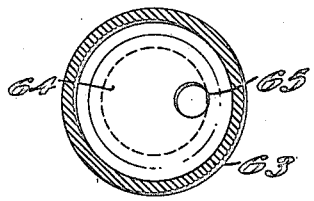
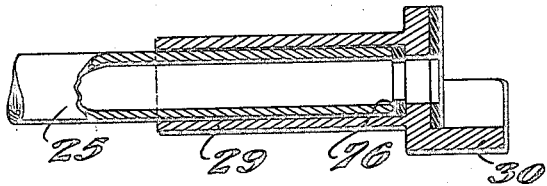
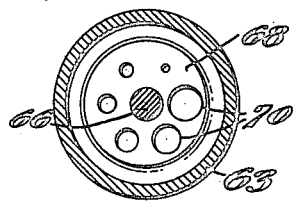
Inventor
John W. Calhoun
By Lloyd W. Patch
His Attorney Patented Oct. 31, 1922.

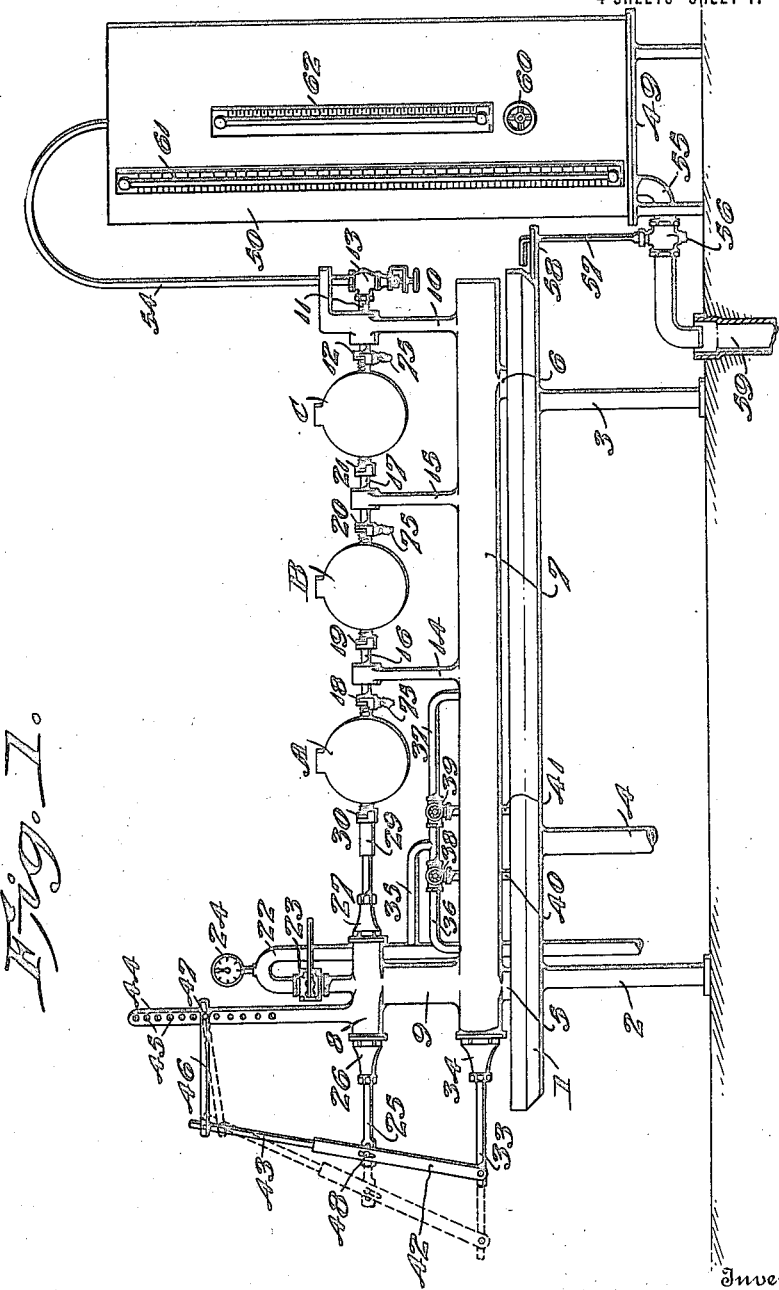

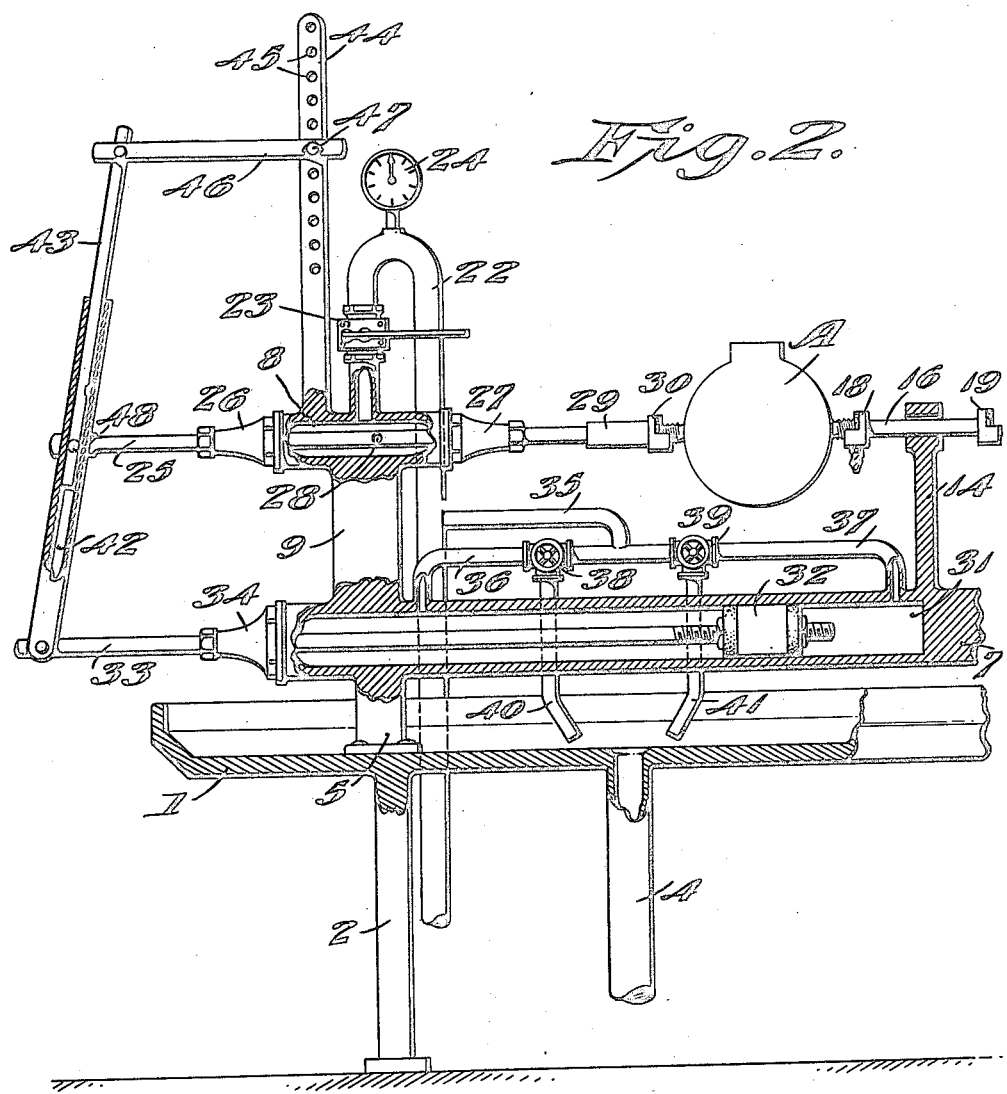

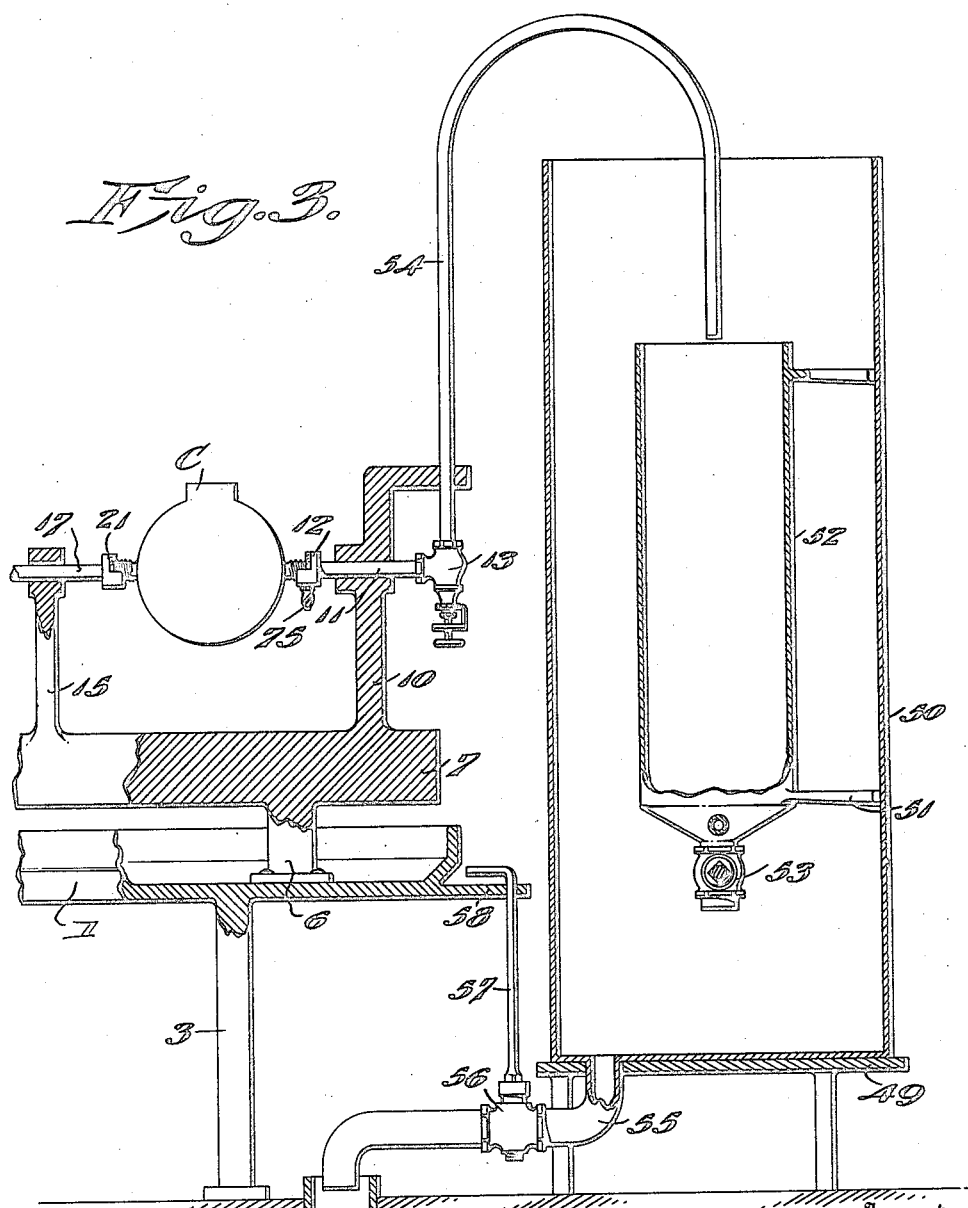

1,434,198

UNITED STATES PATENT OFFICE.

JOHN W. CALHOUN, OF CHESTER, PENNSYLVANIA.

METER-TESTING MACHINE.

Application filed July 25, 1919. Serial No. 313,374.

*To all whom it may concern:*

Be it known that I, JOHN W. CALHOUN, a citizen of the United States, residing at Chester, in the county of Delaware and State of Pennsylvania, have invented new and useful Improvements in Meter-Testing Machines, of which the following is a specification.

This invention has to do with meter testing machines, and pertains particularly to machines of this type intended to be used in testing water meters or other quantity meters for measuring liquids.

An object of my invention is to provide a meter testing machine adapted to take one or a battery of meters, and which is so constructed that meters of different sizes can be placed for testing with great facility and are connected to present water tight joints to the water supply, the means for establishing this water tight connection being constructed to vary the pressure on different sizes of meters, thus guarding against injury to or buckling of the meter casings which would strain the inner workings or throw the same out of alinement.

A further object lies in providing a liquid pressure actuated means to tighten the connection at the meters, which means is connected with the main water supply and is arranged to release the meters as well as tighten the connection against the same.

Another object is to provide a rate of flow valve which will govern the flow of water through the meters and will adapt the machine for the different sizes of meters.

Yet another object resides in arranging large and small quantity measuring tanks, the smaller within the larger and having a valved discharge thereto, and conducting the water passing through the meters into the inside tank, the outer tank to give capacity for testing large meters and the inside tank to be used in testing smaller meters and to give a more accurate measurement of a correspondingly smaller quantity of water.

With these and other objects in view, which will be apparent from the specification, drawings, and claims, this invention includes certain novel features of construction and combinations of parts which will now be set forth.

In the drawings:

Figure 1 is a view in side elevation of a machine constructed in accordance with my invention.

Fig. 2 is an enlarged view of the supply end of the machine with broken sections to better show the arrangement of the parts.

Fig. 3 is a view similar to Fig. 2 taken at the discharge end of the machine.

Fig. 4 is a fragmentary transverse sectional view through the measuring tanks.

Fig. 5 is an enlarged vertical sectional view through the rate of flow valve.

Fig. 6 is a transverse sectional view through the valve showing the seat thereof.

Fig. 7 is a view similar to Fig. 6 to better disclose the construction of the valve stem disc.

Fig. 8 is a detail sectional view of the meter connection adapted to take the meter spud.

Fig. 9 is a sectional view to better disclose the construction of the compressor in the line to the meters.

The main portions of the machine are carried on a table 1, which is supported on legs 2 and 3, this table being made in the form of a catch basin and having a drain pipe 4 leading therefrom to a sewer or other point of waste water discharge.

Legs 5 and 6 support a base member 7 at an elevation above the table, and at one end of the table, which may be referred to as the supply end, a water chamber 8 is supported above base 7 by a standard 9. At the remaining end of the table a standard 10 mounts a water pipe 11 in line with the tubular water chamber 8, a bushing 12 being provided on that end of the pipe toward chamber 8, and a rate of flow valve 13, the structure of which will be hereinafter described in detail, being connected on the outer end of the pipe.

In the present instance I have illustrated an adaptation of the machine to take three water meters which are designated at A, B, and C, and in this adaptation standards 14 and 15 are carried on base 7 intermediate standards 9 and 10. These standards 14 and 15 have horizontal openings formed therethrough in alinement with pipe 11, and short sections of water pipe 16 and 17 are mounted slidably in these openings, these sections having bushings 18 and 19, and 20 and 21 on the ends thereof.

A water supply pipe 22, led from a water main or other source of supply is connected with water chamber 8, and a valve 23 is connected in this water supply pipe to permit regulation and stoppage of the flow of water therethrough, a pressure gauge 24 being connected in the water supply pipe in advance of valve 23. A rod 25 is slidably mounted through water chamber 8, in a manner best shown in Fig. 2, and is alined with water pipes 12, 16, and 17, packing glands 26 and 27 being provided to establish a water tight connection around the rod at the ends of the chamber. This slide rod is bored at its inner end to present a pipe-like form, and has side openings 28 which establish communication with the interior of water chamber 8. A sleeve 29 is received over the open inner end of slide rod 25 and has a bushing 30 similar to the bushings of the several water pipes carried thereby.

Base 7 is bored at that end adjacent water chamber 8 to provide a compression chamber 31, and a piston 32 having suitable packing rings or washers thereon is mounted for reciprocatory movement in the compression chamber. A piston rod 33 extends through the open end of compression chamber 31 and a packing gland 34 is fitted to provide a water tight closure at this end. A branch water pipe 35 is connected with water supply pipe 22 and branch leads 36 and 37 extend therefrom to connect with the ends of compression chamber 31. Three-way valves 38 and 39 are connected in these branch leads and have discharge pipes 40 and 41 extending therefrom to discharge onto the table adjacent drain pipe 4.

In the use of the machine, the several meters are placed, as shown in Fig. 1, to be supported by bushings 12, 18, 19, 20, 21, and 30, pipes 16 and 17 and sleeve 29 being adjusted to dispose the bushings in proper spacing to catch the meter spuds. In this asembly of parts the meters will be supported but water tight connections are not established between the spuds and the bushings, and for the accomplishment of leak proof connections it is necessary that endwise pressure be exerted upon rod 25. With this in mind, I provide a lever made up of the two members 42 and 43 telescopically fitted together and one of which is pivotally connected on the outer end of piston rod 33. An upright arm 44 is formed on water chamber 8 and has a plurality of openings 45 formed along the upper extent thereof. A link 46 is pivotally connected with the lever member 43, and a pin or bolt 47 is provided to pivotally connect the remaining end of the link in one of the openings 45. Pin 48 connects slide rod 25 with lever member 42. To secure the desired endwise pressure upon rod 25, three-way valve 38 is adjusted to open branch lead 36, and water admitted to pressure chamber 31 will act against piston 32 to draw in piston rod 33 and consequently exert sliding force against rod 25. The degree of force exerted can be varied by increasing or decreasing the leverage upon rod 25, through adjustment of the pin or bolt 47 to connect link 46 in different openings of upright arm 44. To release the meters, valve 38 is adjusted for back flow through branch lead 36 to drain 40 and valve 39 is set to supply water through branch lead 37, the piston 32 being moved to withdraw slide rod 25 from the meter holding position.

A stand 49 is provided at the discharge end of table 1 and a measuring tank 50 is supported thereon. Brackets 51 mount a smaller measuring tank 52 within tank 50, a valve 53 being provided to drain inner tank 52 to outer tank 50. A discharge pipe 54 is connected with rate of flow valve 13 to conduct the water therefrom to discharge into the inner tank, and a discharge pipe 55 controlled by a valve 56 having the stem 57 thereof carried by bracket 58 on table 1, to thus be readily accessible, leads to sewer pipe 59 or some other waste pipe suitable to receive the water after tests have been completed.

A hand wheel 60 is provided on the outside of tank 50 for operation of valve 53, and water column gauges 61 and 62 are also provided on the outside of this tank gauge 61 being connected to give measurements in the outer tank and gauge 62 being connected with the inner tank. On gauge 62 the markings are in pounds and ounces, while with gauge 61 the markings on the gauge board are in cubic feet on one side of the column and in gallons on the other side.

The rate of flow valve 13, the construction of which is shown in Figs. 5, 6, and 7, comprises a casing 63 which is connected with pipes 11 and 54. A valve seat 64 is connected in the outlet leading to pipe 54 and is provided with a single opening 65. A stem 66 is revolubly mounted through gland 67 and has a valve disc 68 thereon, spring 69 being provided to insure seating of the disc upon valve seat 64. Disc 68 has a plurality of water flow openings 70 formed concentrically around stem 66 and spaced to register with opening 65. A hand wheel 71 is provided to turn stem 66 and consequently revolve disc 68 to bring different water flow openings 70 into registry with opening 65, a marked gauge 72 being carried by gland 67 and an indicator finger 73 being secured on stem 66 to show settings of the valve disc and consequently indicate the rate of flow of water permitted through said valve.

It is essential to proper operation of the machine that leak proof connections be established between the meter spuds and the bushings by which the same are held, and to accomplish such a connection it is preferable that packing rings 74 be provided upon the bushings to receive the open ends of the spuds. Also, for purposes which will be hereinafter set forth, it is desirable that provision be made at the outlet side of each meter for draining water therefrom, and with this in mind I provide the petcocks 75 on bushings 12, 18, and 20, this structure being best shown in Fig. 8. To secure a proper leak proof connection between sleeve 29 and the inner end of slide rod 25, a packing ring 76 is provided, as shown in Fig. 9, and it will of course be understood that bushing 30 carried by the sleeve is also fitted with a packing ring 74.

When setting up the machine, meter C is placed with one of the spuds in bushing 12, pipe 17 is adjusted to bring bushing 21 to receive the remaining speed, meter B is placed in the same manner, and then meter A is set with one of the spuds in bushing 18 and sleeve 29 is moved to adjust bushing 30 to receive the remaining spud. Valve 38 is opened and water from water supply pipe 22 flows into pressure chamber 31 to force over piston 32 and draw in piston rod 33. This causes the lever to be swung about its connection on link 46 and forces in slide rod 25 to exert pressure within sleeve 29. Hydraulic pressure equal to the head of water within supply pipe 22 is thus made to clamp the meters in place, adjustments for different sizes and various types of meters being accomplished through variation in the length of the lever by moving pin or bolt 47 to other of the openings 45.

The pressure or head of the water within the supply pipe is indicated by gauge 24, and as valve 23 is opened water is supplied to chamber 8 and flows through opening 28 and the hollow end of rod 25 to meter A. Rate of flow valve 13 is closed, and water supplied through the hollow end of rod 25 will flow through to fill the several meters. The petcock 75 of meter C is opened until this meter registers zero, the petcocks on meters B and A being subsequently opened and all of the meters being set with the hands registering zero.

In testing small meters inside tank 52 will be used while with meters of greater capacity the outer tank will be employed, and valves 53 and 55 are adjusted accordingly. Rate of flow valve 13 is set to give the desired flow of water through the meters and valve 23 is kept open until the desired quantity of water has passed through the meters.

In the use as described, the water pressure is indicated at 24, meters A, B, and C, each independently register the flow of water therethrough, valve 13 permits computation of the rate of flow, and gauge 61 or 62 indicates accurately the total volume of water passing from discharge pipe 54. The purpose in providing the inner tank is that small meters can be more accurately tested, whereas the outer tank gives capacity for larger meters, and by taking the readings on the gauges of one or the other of these tanks and computing and calibrating with the other measurements and indications, most accurate tests are accomplished.

When the test is completed valve 23 is closed, valve 38 is set to connect with the drain pipe 40, and valve 39 is turned to open branch lead 37, the hydraulic pressure against piston 32 then acting to force out piston rod 32 and consequently release slide rod 25 which leaves the meters free to be lifted out of their mounting in the bushings of the water line.

In commercial employment of this machine it may be found desirable to construct the parts so that a greater number of meters can be accommodated, but this will of course mean only lengthening the table and base, and providing other standards with the sections of water pipe slidably held therein and fitted with bushings. Also, it may be desired to test less than the full complement of meters for which the machine is constructed, and in this case a straight section of pipe can be fitted between the adjacent bushings where a meter is omitted and the operation of the machine will be carried out in the usual manner. Further, the bushings might be made to take other types of meters or might be constructed to be interchangeable so that meters having water pipe connections of different types can be set for testing, however, as these and similar refinements are obvious it is not thought that these need be shown or enumerated in detail.

While, in the foregoing, I have described specific embodiments, and have mentioned only certain possible modifications, it will be appreciated that other changes might be made, in view of which it will be understood that in practice I do not limit myself to such specific details as herein set forth, but may resort to any practical modifications falling within the scope of the invention as defined in the claims.

I claim:

1. A meter testing machine including with means to hold a meter in position to have fluid circulate therethrough, clamping means to bring said holding means to an operative position, hydraulic means to operate the clamping means, and means independent of the hydraulic means to adjust the clamping force.

2. A meter testing machine including with means to hold a meter in position to have fluid circulate therethrough, clamping means to bring said holding means to an operative position, hydraulic means to operate the clamping means, means independent of the hydraulic means to adjust the clamping force, and means arranged to give measurements of the fluid passing through the meter.

3. A meter testing machine adapted to test a plurality of meters including with a supporting base having standards thereon, a fixed pipe section carried by a standard at one end of the base, a clamping pipe section movably fitted in a standard at the opposite end, slidable pipe sections fitted in intermediate standards in line with the fixed and clamping sections, packing bushings on said pipe bushings to receive and support meters, and means to move the clamping pipe section to secure a proper packing bearing between the bushings and meters.

4. A meter testing machine adapted to test a plurality of meters including with a supporting base having standards thereon, a fixed pipe section carried by a standard at one end of the base, a clamping pipe section movably fitted in a standard at the opposite end, slidable pipe sections fitted in intermediate standards in line with the fixed and clamping sections, packing bushings on said pipe bushings to receive and support meters, means to move the clamping pipe section to secure a proper packing bearing between the bushings and meters, and means to adjust the clamping force exerted against the meters.

5. A meter testing machine adapted to test a plurality of meters including with a supporting base having standards thereon, a fixed pipe section carried by a standard at one end of the base, a clamping pipe section movably fitted in a standard at the opposite end, slidable pipe sections fitted in intermediate standards in line with the fixed and clamping sections, packing bushings on said pipe bushings to receive and support meters, lever means to move the clamping pipe section, and fluid actuated means to operate the lever means.

6. A meter testing machine adapted to test a plurality of meters including with a supporting base having standards thereon, a fixed pipe section carried by a standard at one end of the base, a clamping pipe section movably fitted in a standard at the opposite end, slidable pipe sections fitted in intermediate standards in line with the fixed and clamping sections, packing bushings on said pipe bushings to receive and support meters, lever means to move the clamping pipe section, fluid actuated means to operate the lever means, and means to adjust and vary the force exerted by the lever means.

7. A meter testing machine including with means to hold water meters of different sizes in position to have water circulated therethrough, a water volume measuring tank into which water from the meter is discharged, a relatively larger water volume measuring tank within which said first mentioned tank is supported, and a valve controlled discharge from said inner tank to the outer tank.

8. A meter testing machine including with means to hold meters of different sizes to have water circulated therethrough, a rate of flow valve to which the water passes from said meters, manually settable to accommodate the size of the meter being tested, a large water tank, a smaller water tank mounted within said large tank, water volume indicating gauges for each of said tanks located externally on said larger tank, a water discharge pipe from said rate of flow valve to the smaller tank, a discharge opening from the smaller to the larger tank, and a valve operable from outside of the larger tank to open and close this discharge.

9. A meter testing machine including with a table, a base carried on said table chambered at one end to provide a compression chamber, a piston slidably received in said compression chamber and having a piston rod extending therefrom, standards disposed along the length of said base, a water pipe having a meter spud receiving bushing fixedly carried by one of said standards, a water cylinder carried by another of the standards, a water supply pipe led to said water cylinder, branch leads from said water pipe connected with the compression chamber on opposite sides of the piston therein, valves controlling said branch leads, a slide rod mounted in said water cylinder bored at one end and having openings within the water cylinder to communicate with said bore, a meter spud receiving bushing carried at the inner end of said slide rod around the opening of the bore, and a lever connected pivotally with said slide rod and with the piston rod to force said slide rod to clamp a meter between the bushing thereof and the bushing on the fixed water pipe.

10. A meter testing machine including with a table, a base carried on said table chambered at one end to provide a compression chamber, a piston slidably received in said compression chamber and having a piston rod extending therefrom, standards disposed along the length of said base, a water pipe having a meter spud receiving bushing fixedly carried by one of said standards, a water cylinder carried by another of the standards, a water supply pipe led to said water cylinder, branch leads from said water pipe connected with the compression chamber on opposite sides of the piston therein, valves controlling said branch leads, a slide rod mounted in said water cylinder bored at one end and having openings within the water cylinder to communicate with said bore, a meter spud receiving bushing carried at the inner end of said slide rod around the opening of the bore, sections of water pipe slidably fitted to intermediate standards in line with said fixed water pipe and said slide rod and provided at their ends with meter spud receiving bushings, and a connection between said slide rod and the piston rod by which said slide rod is moved to clamp and hold meters supported by the several bushings when water is admitted to one end of said compression chamber.

11. A meter testing machine including with a table, a base carried on said table chambered at one end to provide a compression chamber, a piston slidably received in said compression chamber and having a piston rod extending therefrom, standards disposed along the length of said base, a water pipe having a meter spud receiving bushing fixedly carried by one of said standards, a water cylinder carried by another of the standards, a water supply pipe led to said water cylinder, branch leads from said water pipe connected with the compression chamber on opposite sides of the piston therein, valves controlling said branch leads, a slide rod mounted in said water cylinder bored at one end and having openings within the water cylinder to communicate with said bore, a meter spud receiving bushing carried at the inner end of said slide rod around the opening of the bore, a two part extensible lever having one of the parts thereof pivotally connected with said slide rod and the piston rod, an upright bracket fixed on said water cylinder provided with a plurality of openings spaced in a vertical line, a link pivotally connected with the extensible member of said lever, and means to connect said link in one of the openings of said bracket.

12. A meter testing machine including with a table, a base carried on said table chambered at one end to provide a compression chamber, a piston slidably received in said compression chamber and having a piston rod extending therefrom, standards disposed along the length of said base, a water pipe having a meter spud receiving bushing fixedly carried by one of said standards, a water cylinder carried by another of the standards, a water supply pipe led to said water cylinder, branch leads from said water pipe connected with the compression chamber on opposite sides of the piston therein, valves controlling said branch leads, a slide rod mounted in said water cylinder bored at one end and having openings within the water cylinder to communicate with said bore, a meter spud receiving bushing carried at the inner end of said slide rod around the opening of the bore, a two-part extensible lever having one of the parts thereof pivotally connected with said slide rod and the piston rod, an upright bracket fixed on said water cylinder provided with a plurality of openings spaced in a vertical line, a link pivotally connected with the extensible member of said lever, means to connect said link in one of the openings of said bracket, a pressure gauge in said water supply pipe, a manually settable rate of flow valve connected with said fixed water pipe, a water volume measuring tank to which water passing through said valve is discharged, a larger water volume measuring tank in which said first mentioned tank is disposed and a valve discharge from the inner tank to the outer.

In testimony whereof, I affix my signature.

JOHN W. CALHOUN.